May 26, 1970 W. POSCHENRIEDER 3,514,726

PULSE CONTROLLED FREQUENCY FILTER

Filed Jan. 24, 1967 3 Sheets-Sheet 2

United States Patent Office 3,514,726

Patented May 26, 1970

3,514,726

PULSE CONTROLLED FREQUENCY FILTER

Werner Poschenrieder, Munich, Germany, assignor to Siemens Aktiengesellschaft, Munich, Germany Filed Jan. 24, 1967, Ser. No. 611,315

Claims priority, application Germany, Jan. 28, 1966, S 101,671

Int. Cl. H03h *7/10, 7/14*

U.S. Cl. 333—70 10 Claims

ABSTRACT OF THE DISCLOSURE

An improved frequency filter responsive to control pulses which determine the characteristic frequencies thereof. A plurality of selectively actuated switches operated by the control pulses complete circuits for effecting pulse-type energy exchanges between associated storage capacitors. Circuit elements are provided to substantially eliminate energy losses in the filter. Long line transmission segments, analogous to the filter, are developed to determine the frequnecy characteristics of the filter.

CROSS REFERENCE TO RELATED APPLICATION

Applicant's claim priority from corresponding German application Ser. No. 101,671, filed Jan. 28, 1966. Further, the invention described in this application relates to an improvement of the invention described in copending U.S. applications identified by Ser. Nos. 600,904 and 601,057, filed Dec. 12, 1966.

BACKGROUND OF THE INVENTION

Field of the invention

This invention relates to frequency filters and more particularly to frequency filters including switches which are controlled by periodic, control pulses or trains.

Description of the prior art

The prior art discloses the utilization of frequency filters having switches actuated by periodic control pulses, which determine the characteristic frequency of the filter. The switch actuation results in a pulse-type energy exchange between the capacitors associated with a given switch. Further, according to the teachings of copending applications Ser. Nos. 600,904, and 601,057, both filed Dec. 12, 1966, and assigned to the same assignee as the instant invention, the entire charge energy of the storage capacitor participating in such a charge exchange is transferred to the other associated capacitor also participating into the given exchange. Further, such frequency filters may be constructed either as quadripole or four terminal networks, or as bipole or two terminal networks. Additional switches and amplifier compensation means are known which may be provided to substantially eliminate loss of signal energy occurring within the filter. However, in the filter circuits described in the copending applications referred to above, a primary capacitor is provided which takes part in every energy exchange. This limits the frequency characteristics available from such filters. Further, said prior art filters normally function in only one mode of switch actuation, further limiting the frequency characteristics available.

BRIEF DESCRIPTION OF THE INVENTION

These and other defects and disadvantages of prior art filter circuits of the control pulse actuated types are overcome by the filter circuits of this invention. In particular, frequency filters are herein disclosed, having multiple circuit band frequency characteristics. Thus, depending on the mode of operation of the switches provided, the filter exhibits band pass or band rejection frequency characteristics.

The frequency filters of the invention are controlled by periodic control pulses which successively actuate individual switches. Depending on the frequency of actuation, and the mode of switch actuation or operation, impulse or charge exchanges between a primary capacitor, and a plurality of secondary capacitors take place. The plurality of secondary capacitors are divided between two basic filter groups connected in series, with the primary capacitor being connected to the series connection thereof as a quadripole or four terminal network. Thus, the filter essentially comprises a T-type network, with the two groups of secondary capacitors comprising the arms thereof, and the primary capacitor and any associated auxiliary capacitors comprising the leg thereof.

Further, the secondary capacitors are provided with individual switches which can effect a plurality of modes of operation. For example, several switches can be actuated synchronously, or the switches can be actuated successively and alternately.

By providing individual switch controls for the capacitors taking part in the energy or impulse exchanges, and different ways such that various modes of operation are by selectively actuating the switches in a plurality of possible, a variety of frequency characteristics are thus made available. In particular, a plurality of band pass and band rejection frequencies are thereby obtainable, which is highly advantageous, and which the prior art is not capable of attaining.

DETAILED DESCRIPTION OF THE INVENTION

The frequency filters disclosed in FIGS. 1–3, comprise filters wherein energy exchange losses are compensated, as described in the copending applications referred to above. Further, associated inductors are provided as taught in the copending applications, to ensure energy exchanges rather than equalization between associated capacitors. Additional inductors and capacitors are also provided in conjunction with amplifier circuits, to compensate for any energy losses occurring. These are not shown, however, to simplify the drawings.

Figure 1A:
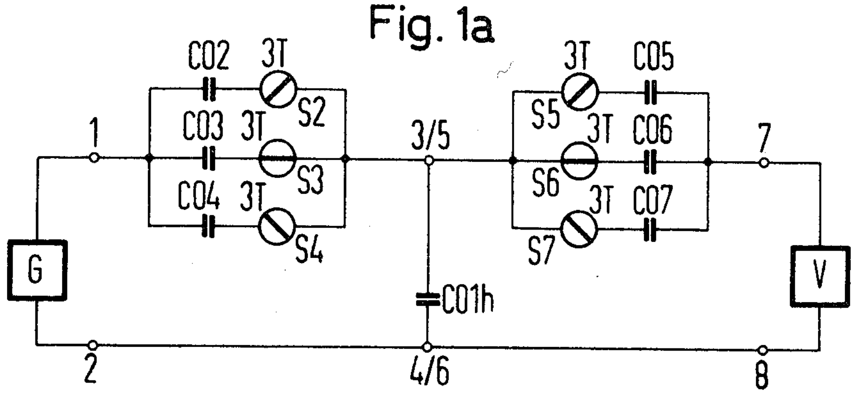
FIG. 1*a* shows the frequency filter developed in accordance with the invention, illustrating the arrangement of capacitors and their associated switches, and showing two groups of secondary capacitors connected in series, with the primary capacitor connected to the series connection thereof.

In FIG. 1*a*, a frequency filter comprising three basic filter groups is illustrated, connected as a quadripole or four terminal network between generator G and consumer V. Condensors CO2–CO7 comprise secondary capacitors having associated series connected switches S2–S7, respectively. The first and second groups of secondary capacitors comprising CO2–CO4 and CO5–CO7, respectively, are connected in series between terminals 1 and 7. Primary capacitor CO1*h* is connected between the series connection 3/5 of the first and second groups of capacitors, and common connection 4/6 of generator G and consumer V.

In the first mode of operation, switches S2, S3, and S4, associated with the first group of secondary capacitors CO2, CO3, and CO4, respectively, are successively and periodically actuated. Thus, each of the individual switches, S2, S3, and S4, is actuated once during the time interval 3T; the time interval assigned to each of these switches during which it may be actuated is T. This mode of operation is illustrated in FIG. 1 which shows switches S2, S3, and S4, having switch arms displaced 60° from each other.

In like manner, switches S5, S6, and S7 which comprise the second group of basic filters in association with capacitors CO5, CO6, and CO7, respectively, are also actuated successively in periodic time sequence, as illustrated by the switch arms being displaced 60° from each other. Further, switches S2, S5; S3, S6; and S4, S7 are synchronously actuated in pairs in the first mode of operation, and the primary capacitor thereby takes part in every energy exchange caused by actuation of switches S2–S7.

The frequency filter of FIG. 1*a*, has similar characteristics of the band filter shown in illustration 112 of Barkhausen, "Electronic Tubes," volume III, 1929, p. 227. However, instead of using capacitors, and inductors having relatively large inductance, the elements disclosed in applicant's FIG. 1*a*, as well as in FIGS. 2*a* and 3*a*, comprise capacitors, switches, and loss-eliminating means. Some inductance must be present, however, to provide resonant characteristics.

Figure 1B:
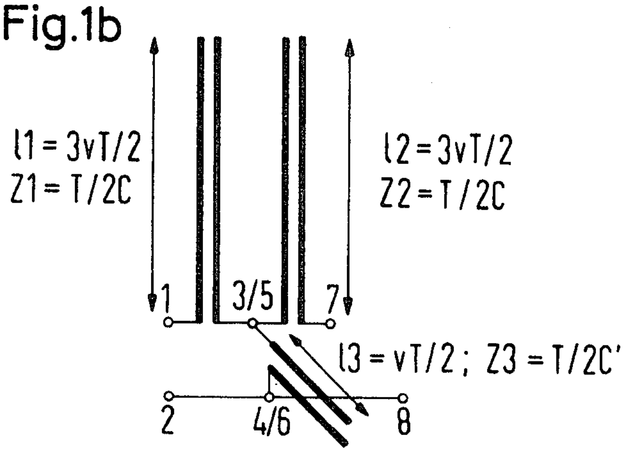
FIG. 1*b* illustrates a frequency filter analogous to that shown in FIG. 1*a*, for a particular control frequency developed from three transmission line segments.
Figure 1C:
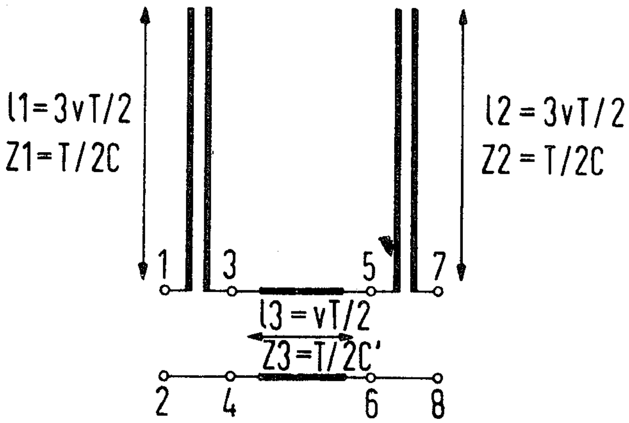
FIG. 1*c* illustrates a frequency filter analogous to the filter disclosed in FIG. 1*a*, and comprised of three transmission line segments, for another control frequency.

The frequency characteristics of the frequency filter illustrated in FIG. 1*a*, can be determined with the aid of FIGS. 1*b* and 1*c*. This also applies to the frequency filters illustrated in FIGS. 2*a* and 3*a*; that is analogous transmission line segments illustrated in FIGS. 2*b* and 3*b*, respectively, can be utilized to illustrate the frequency characteristics thereof.

Thus, it is known that transmission line segments can have the same frequency effects of basic filters comprising conventional reactive elements. Thus, by varying the electrical length L, and wave resistance Z of the transmission line segments, various properties analogous to those of resonant circuits, can be produced.

Figure 2A:
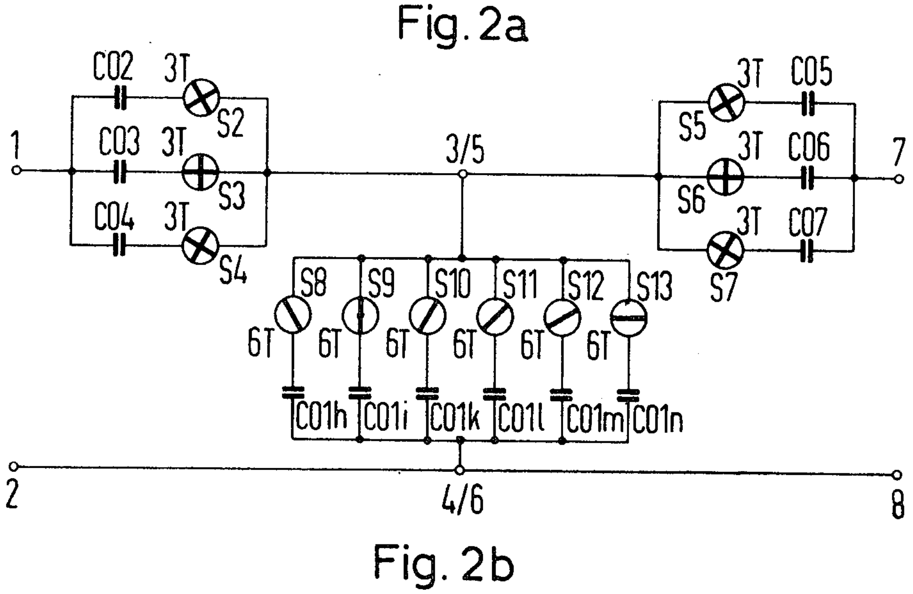
FIG. 2*a* illustrates another embodiment of the frequency filter wherein a plurality of circuits comprising auxiliary capacitors and series connected switches are associated with the primary capacitor.
Figure 2B:
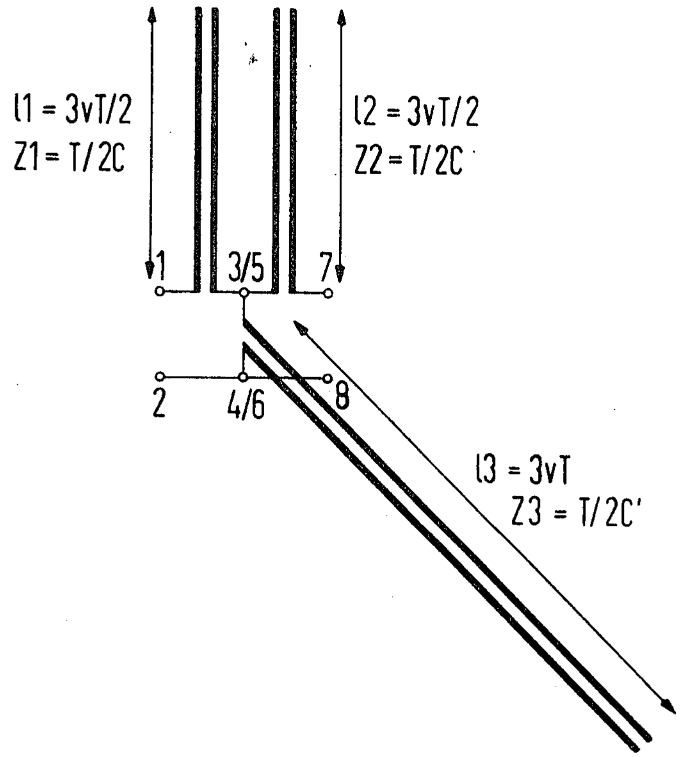
FIG. 2*b* illustrates a frequency filter analogous to the frequency filter disclosed in FIG. 2*a*, and comprising three transmission line segments.
Figure 3A:
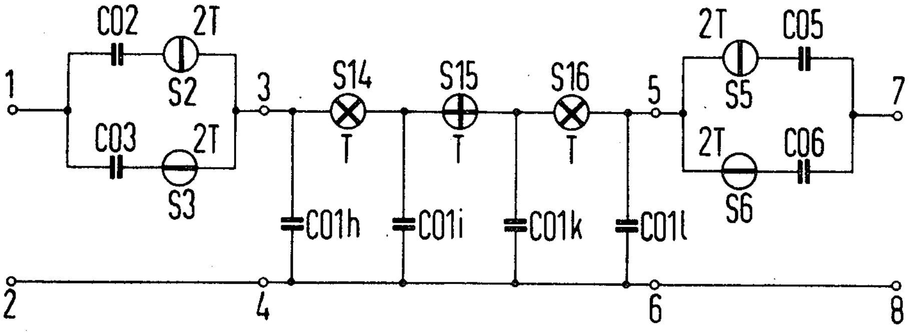
FIG. 3*a* illustrates another embodiment of the invention comprising three transmission line segments arranged to provide a frequency filter analogous to that illustrated in FIG. 1*a*, wherein auxiliary parallel capacitors are arranged parallel to the primary capacitor, and wherein the switches associated with the auxiliary capacitors are arranged in series between the first and second groups of secondary capacitors.

Thus, in FIGS. 1*b* and 1*c*, and in FIGS. 2*b* and 3*c*, the thin lines represent electrical connections between various terminals of the filter illustrated in FIG. 1*a*, and the electrical length of the transmission line segments analogous to the basic filter groups comprising the electric circuits illustrated in FIGS. 1*a*, 2*a*, and 3*a*, are shown with thick lines. It is well known in the prior art that conventional filters can be developed by analogy to transmission line segments. For example, see Meinke, "Theory of High Frequency Circuits," 1951, pp. 209–241.

The first basic filter group connected between terminals 1 and 3/5 comprises secondary capacitors CO2, CO3, and CO4, of equal capacitance C series connected to switches S2, S3, and S4, respectively. When operated in the first mode of operation, the first basic filter group possesses frequency characteristics similar to a transmission line segment open at the end, and operated in double-pole manner as illustrated in FIG. 1*b*. The electrical length L of the line segment, equals $3vT/2$, wherein T is the above defined time period characteristic for the actuation of individual switches S2–S7, and $v$ is the propagation speed of the waves.

Thus, the electrical length L is proportional to the number of parallel switched secondary capacitors, provided that within a group of secondary capacitors, all associated switches are actuated alternately and successively so that with N switches, each individual switch is actuated only once during the time period NT, and further, so that the characteristic time period T elapses between actuation of successively actuated switches. The electrical length L can also be increased by increasing the characteristic time period T; hence, the resonance frequencies of the filter can be varied, by thus varying the equivalent electrical length.

As illustrated in FIG. 1*b*, the wave impedance of the transmission line segment illustrated, ZL, equals $T/2C$. Thus, it varies directly as the characteristic time period T, and inversely to the capacitance C of secondary capacitors CO2–CO4. Since only one of these capacitors is connected to the circuit at any one time, because of the alternative and successive actuation of its associated switch, the impedance ZL is not dependent upon the number N of secondary capacitors.

The second basic filter group comprising capacitors CO5, CO6, and CO7, connected in series with switches S5, S6, and S7, respectively, also comprises three secondary capacitors connected between terminals 3/5 and 7. Thus, it functions similarly to the first basic filter group connected between terminals 1 and 3/5. However, it is to be understood, that the number of capacitors and of associated series connected switches, and the capacitance of the capacitors comprising the second basic filter group, can be different from that of the first basic filter group. This may be desirable, for example, in order to produce a resonance curve having a different flank steepness; which varies directly as the number N of secondary capacitors, and inversely in relation to the capacitance of the secondary capacitors. As discussed in relation to the first basic filter group, the electric length $L_2$ varies according to the formula $L_2=3vT/2$; whereas the wave impedance $Z_2$ of the electrical line analogous to the second basic filter group, varies according to the formula $Z_2=T/2C$. These relationships are also shown in FIG. 1*b* of the drawings.

The third basic filter group comprising primary capacitor CO1H is connected between terminals 3/5 and 4/6. It possesses properties similar to the open transmission line segment operated in double-pole fashion, illustrated in FIG. 1*b* having the electrical length $L_3$. Thus, during synchronous operation of the switches comprising the first and second basic filter groups, charge exchanges between the principal capacitor CO1H, and one capacitor from each of the two groups of secondary capacitors, must occur simultaneously.

The electrical length $L_3$ of the electric line analogous to the third basic filter group varies according to the formula $L_3=vT/2$; and the impedance thereof, $$Z_{3},=T/2C'$$

where C′ is the capacitance of the primary capacitor, CO1H. These formulae correspond to the formulae given for the electrical length and resistance of the analogous electrical lines of the first and second basic filter groups.

Different resonant characteristics are obtained if the switches are actuated in a different sequence, or mode of operation. For example, switches S2–S7 can be actuated successively and alternately in the following series:

S2–S5–S3–S6–S4–S7–S2–S5 . . . etc.

The time interval between the actuation of switches within each individual group will, therefore, be T, as in the case of the previously described (for example) but the time interval or period between successive actuation of switches between the first and second groups is $T/2$. In this second mode of operation, simultaneous charge exchanges occur between the primary capacitor CO1H, and one of the capacitors of either the first or second groups of basic filters. Therefore, the primary capacitor has the effect of a delay line inserted between the two groups of primary capacitors.

In the second mode of operation, the frequency filter illustrated in FIG. 1*a*, is analogous to a transmission line having a line segment operated as a quadruple or four-terminal pole between switching points 3/4 and 5/6. However, the equivalent electrical length $L_3$, and wave impedance $Z_3$ of this line segment, is determined by the same formulae as that used in computations of the first mode of operation, as illustrated in FIG. 1*c*.

This analogy between the basic filter groups and transmission line segments is true if the frequency filters developed from line segments are fed with sine wave alternating signal currents, and if the frequency filters illustrated in FIGS. 1*a*, 1*b*, and 1*c*, are fed with amplitude modulated signal impulses, the succession frequency thereof being equal to the reciprocal value of the defined time characteristic T, and the modulation frequency thereof being equal to the frequency of said sine wave alternating signal currents. Further, according to the scanning theorem criteria discussed in the copending applications, the succession frequency of the switch control pulses should be at least twice the frequency of the sign wave alternating signal current, to effect energy exchanges between associated capacitors. By analyzing frequency filters developed according to the invention disclosed herein, and analogous filters developed from conventional transmission line segments, the frequency phase of the frequency filter illustrated in FIG. 1*a* can be determined. Thus, the band pass and band rejection frequency ranges determined by the two modes of operation heretofore described, can be readily determined.

Depending of the magnitude of the modulation frequencies applied thereto, transmission line segments normally exhibit parallel and series resonance characteristics. For example, if the modulation frequency equals ⅙T, the line segments having electrical lengths, $L_1$ and $L_2$ (see FIG. 1*b*) equal λ4, and thus behave similarly to series resonance circuits. This can be derived from the formulae given in FIG. 1*b*, by equating "V," the propagation speed of the waves to $\lambda/f$. Therefore, at the modulation frequency ⅙T, the first and second basic filter groups have very low resistances.

Further, the transmission line segment having the electrical length $L_3$, has, at the same modulation frequency of ⅙T, a length $\lambda/12$ which is considerably shorter than $\lambda/4$. In the first mode of operation described heretofore and illustrated by the analogous transmission line characteristics illustrated in FIG. 1*b*, $L_3$ will therefore, exhibit capacitive characteristics. Hence, the corresponding equivalent third basic filter group comprising primary capacitor CO1H will also act capacitatively, and will have an impedance which is relatively high compared to the low resistance of the first and second basic filter groups. Therefore, the frequency filter circuit illustrated in FIG. 1*a*, under these conditions, will comprise a band pass filter for the frequency ⅙T.

In the second mode of operation at modulation frequency ⅙T, the first and second basic filter groups comprising, respectively, CO2–CO4 and associated switches S2–S4, and CO5–CO7 and associated switches S5–S7, will again exhibit series resonant characteristics, and will, therefore, have low resistances. That is, the first and second basic filter groups will again have characteristics analogous to a transmission segment having electrical lengths equal to $\lambda/4$. Further, the transmission line segment having the electrical length $L_3$, will again be shorter than $\lambda/4$, and in fact, will equal $\lambda/12$. However, when the circuit illustrated in FIG. 1*a* functions as a quadripole or four-terminal network, relative to principle capacitor CO1H, the transmission line segment $L_3$ of length λ12 acts as a resistance transforming network between terminals 4/6 and 3/5. However, at $L_3$ equal to $\lambda/12$, the input impedance to the second basic filter connected in series to consumer V is sufficiently high so that the transmission of the modulation frequency signals is not considerably influenced thereby. Therefore, the circuit illustrated in FIG. 1*a*, when operated in the second mode of operation, still comprises a frequency filter network having band pass characteristics for modulation frequency ⅙*T*.

At modulation frequency ⅓T, the transmission line segments corresponding to electrical length $L_1$ and $L_2$, are analogous to $\lambda/2$ parallel resonant circuit. Therefore, the corresponding equivalent first and second basic filter groups comprising CO2, CO3, CO4, and CO5, CO6, CO7, respectively, exhibit parallel resonant circuit characteristics, and have very high impedances.

When the circuit of FIG. 1*a* is operated in the first mode of operation, that is when switches S2 and S5, S3 and S6 and S4 and S7, are successively actuated in pairs, the electrical length of transmission line segments $L_3$ is still greater than $\lambda/4$, and is equal to $\lambda/6$. Therefore, the equivalent corresponding primary capacitor CO1H, still exhibits capacitive characteristics, but it now has a relatively low impedance, compared to the high impedance characteristics of the first and second basic filter groups. Therefore, at modulation frequency ⅓T, primary capacitor CO1H will bypass said frequency signals, and the frequency filter network of FIG. 1*a* will comprise a band rejection filter.

In the second mode of operation, however, that is when switches S2–S7 are operated alternately and successively, the primary capacitor CO1H at modulation frequency ⅓T will comprise a quadripole operated transmission line segment, the electrical length thereof again being shorter than $\lambda/4$. The first and second basic filter networks will comprise $\lambda/2$ parallel resonant circuits with extremely high impedances. Therefore, a $\lambda/2$ parallel resonant circuit with extremely high impedance is connected between switching points 5 and 7, in series connection with consumer V. The voltage thereacross will thus be divided such that a considerably smaller voltage appears at the terminals 7–8 to the consumer V, than appears across the parallel resonant circuit between terminals 5–7.

Further, the transmission line segment between switching points 3/4 and 5/6 functions similarly to a transformer, in that it transforms the extremely high impedance between switching points 5 and 6, into a relatively smaller resistance between switching points 3 and 4. Therefore, the analogous primary capacitor functions in a corresponding manner.

This can be explained in another way. Thus, it is seen that when switches S2–S7 are successively and alternately actuated in the second mode of operation, impulses generated by generator G will at modulation frequency ⅓*T* be stored at primary capacitor CO1H in such a manner that a charge on capacitor CO1H is of opposite polarity relative to the succeeding charges generated by generator G. Therefore, the third basic filter circuit connected between terminals 3/5 and 4/6 will have a low resistance looking into said circuit from terminal 3/4, and will comprise a high resistance source from terminals 5/6. Thus, in effect, the filter circuit between terminals 3/5 and 4/6, will act as a resistance transformer.

The extremely high resistance between terminals 1 and 3, a parallel resonant circuit, will therefore be in series with the low resistance network existing between terminals 3/4. Thus, the voltage across this series connection will be divided, such that the voltage across terminals 3/4, will be considerably lower than the voltage developed by generator G.

Therefore, the voltage developed at the output terminals 7–8 is considerably lower than the voltage applied to input terminals 1–2, since the input modulation frequency signal is, in effect, divided twice. The frequency filter illustrated in FIG. 1, when operating in the second mode of operation, thus functions as a band rejection filter.

It is apparent that the ratio of the input signal supplied by generator G or the modulation frequency signal to the frequency of the switching signal impulses $1/T$, determine the filter characteristics of the circuit. Further, the band pass and band rejection ranges can be varied by a plurality of parameters. For example, it is dependent on the characteristic time duration T. Further, the number of secondary capacitors within each basic filter group determines the electrical length of the corresponding analogous transmission line segments $L_1$ and $L_2$. Therefore, by varying the capacitance of the secondary capacitors CO2–CO7, and the primary capacitor CO1H, and the wave impedance Z of the basic filter networks, filter characteristics such as flank steepness and band width can be varied to the desired extent.

An advantage of the frequency filters developed in the instant invention, is that they are analogous to transmission line segments having extremely large electrical lengths. Further, the wave impedance of said frequency filters can be readily changed by simply varying the capacitance of the primary or secondary capacitors. For example, the electrical lengths of the transmission line segments of FIG. 1*b* are, at a succession frequency of $$1/T=10 \text{ kHz.}$$

of the signal impulses, the following lengths:

$$L_1-L_2=45 \text{ kilometers; } L_3=15 \text{ kilometers}$$

Therefore, the frequency filters function at relatively low frequencies, in a manner analogous to high frequency filters comprising transmission line segments.

In the first and second modes of the operation described above, as explained heretofore, the frequency filter can only be utilized at modulation frequencies below the border frequency ½T. However, by varying the number of secondary capacitors within each group of first and second basic filters, the band pass and band rejection frequency width, thereof, and the number of series resonances and parallel resonances and the frequencies at which they occur, can also be changed. For example, with only two secondary capacitors within a group, only a single series resonant frequency lies within the allowable modulation range, that is at half the border frequency. Further, the parallel resonant frequency of such a group lies at the border frequency itself, and therefore is only useable to a limited extent.

If three secondary capacitors are utilized, the lowest frequency at which series resonance occurs is ⅓ of the border frequency, and the lowest utilizable parallel resonant frequency is ⅔ of said border frequency. At the border frequency itself, a second series resonant frequency is available, but to only a limited extent.

When six secondary capacitors are used, the lowest utilizable series resonant frequency is ⅙ of the border frequency at ⅓ of the border frequency, a parallel resonant frequency is available; at ½ of the border frequency, a second series resonant frequency is available; at ⅔ of the border frequency, a second parallel resonant frequency is available; at ⅚ of border frequency, a third series resonant frequency is available; and at the border frequency, a third parallel resonant frequency is available, but only to a limited extent. Since series resonances and parallel resonances alternate, along the frequency range available, the number of resonant frequencies available to one group comprising N number of secondary capacitors, is a whole number multiple of ½TN, where ½T is the border frequency. Thus, by changing the number of secondary capacitors in a group, the number of resonant frequencies as well as their location with the allowable frequency range, can be varied. Further, the band pass and band rejection ranges are also thus variable.

FIG. 2*a* illustrates another embodiment of the frequency filter network, in which the primary capacitor CO1H is supplemented by auxiliary parallel connected capacitors COLI–COLN. Further, individual switches S8–S13 are connected in series with capacitors COLH–COLN, respectively, and are similar to the switches S2–S7 illustrated in FIG. 1*a*.

The switches associated with primary capacitor COLH and auxiliary capacitors COLI–COLN connected in parallel therewith, are also actuated successively, in periodic time sequence, as indicated by the varying position of the switch arms illustrated in FIG. 2*a*. Successive arms of switches S8–S13 are periodically actuated, the time interval between the actuation of adjacent switches being equal to the characteristic time period T. Therefore, each switch within the group of primary capacitors COLH–COLN is actuated only once within the time period 6T switches S2–S7, are actuated twice as much as switches S8–S13, and therefore are shown as comprising double arms. Switches S8–S13 are actuated in pairs as described in the second mode of operation.

Thus, in all three groups of capacitors, only one of the switches associated with its corresponding capacitor, is actuated at one time. Further, successive switches can be actuated only after the characteristic time period T expires, so that each individual switch within a group is actuated only once within the time period NT where, in the group in question, there are a total of N capacitors.

FIG. 2*b* illustrates the equivalent transmission line segments, analogous to the frequency filter illustrated in FIG. 2*a*. This is substantially similar to the analogous transmission line segment diagram illustrated in FIG. 1*b*, in that the two line segments connected between circuit points 1, 3/5 and 3/5–7 have the same electrical lengths $L_1$ and $L_2$, as well as the same wave impedance $Z_1$ and $Z_2$, as the formulae given in FIG. 1*b*. The group of capacitors comprising primary capacitor CO1H, and parallel auxiliary capacitors COLI–COLN connected between switching points 3/5 and 4/6, exhibit characteristics of a dipolarly operated transmission line segment, open at the end thereof. The electrical length $L_3$ equals $3vT$, and the wave impedance $Z_3$ equals $T/2C'$ as identified in FIG. 2*b*, when six capacitors are connected between circuit points 3/5 and 4/6, where $C'$ is the capacitance of each of capacitors COLH–COLN.

Thus, it is seen that the electrical $L_3$ is proportional and varies directly as the total number of capacitors in the group comprising the primary and auxiliary capacitors in the group comprising the primary and auxiliary capacitors, and its wave impedance $Z_3$, depends directly on the characteristic time direction T, and inversely as the capacity $C'$ of each of the parallel capacitors. As discussed heretofore, at modulation frequency equal to ⅙*T*, the two groups of secondary capacitors CO2–CO4 and CO5–CO7 again exhibit series resonance characteristics and therefore have very low resistance. At the same modulation frequency, the dipole filter circuit connected between circuit points 3/5 and 4/6 functions as a parallel resonant circuit, and therefore has very high resistance, relatively speaking. Thus, the frequency filter illustrated in FIG. 2*a* possesses band pass characteristics at the modulation frequency ⅙*T*. By varying the number of secondary capacitors within each group of secondary capacitors CO2–CO4 and CO5–CO7, the number of resonant frequencies available is also varied. Further, by varying the number of capacitors comprising the third basic filter group CO1H–CO1N, the resonance frequencies of the dipole filter circuit connected between 3/5 and 4/6, may also be varied in like manner.

FIG. 3*a* shows a still further embodiment of the basic frequency filter illustrated in FIG. 1*a*, wherein more complicated frequency characteristics can be obtained. In FIG. 3*a*, the secondary capacitors CO2–CO6 are divided into two groups of basic filters. Thus, the first basic filter group comprising capacitors CO2 and CO3 are connected in series with associated switches S2 and S3 respectively. The second basic filter group comprising secondary capacitors CO5 and CO6 are also connected in series with associated switches S5 and S6.

As discussed previously in the applications heretofore cross referenced, the frequency of the control pulses by which the switches are actuated, should be at least twice the modulation frequency of the input signal (the scanning theorem) to effect charge exchanges between associated capacitors. Under these circumstances, and with the utilization of only two parallel secondary capacitors in each of the first and second basic filter groups, the number of resonant frequencies available are limited. In FIG. 3*a*, there occurs only one resonant frequency producing a series resonant circuit for each of the two basic filter groups connected respectively between terminals 1 and 3, and between terminals 5 and 7.

Therefore, switches S2 and S3, and switches S5 and S6, are actuated by control pulses such that the time interval between successive actuations comprises the characteristic time period T. Also switches S2 and S5 are synchronously actuated, as are switches S3 and S6. This means that each of the switches S2, S3, S5, and S6 are actuated only one in the time period 2T.

FIG. 3*a* also shows three parallel auxiliary capacitors COLI, COLK, and COLL, respectively. As illustrated in FIG. 3*a*, switches S14, S15, and S16, are actuated twice as frequently as switches S2, S3, S5, and S6. That is, the time interval between successive actuation of switches S14, S15, and S16, is $T/2$. Switch S14 is actuated in a time interval equal to $T/2$ compared to actuation of switches S2, S3, and S15. Further, switch S16 is actuated a time interval equal to $T/2$, spaced from the time at which S5, S6, and S15 are actuated. Thus, switches S14, S15, and S16, which are connected in series between terminals 3 and 5 are actuated successively and alternately following a time period equal to $T/2$, and are thereby actuated only once during the characteristic time period T.

Figure 3B:
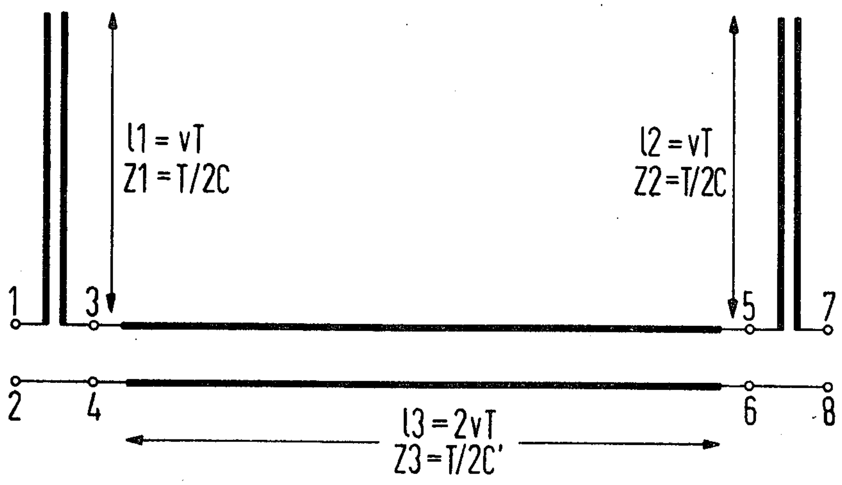
FIG. 3*b* illustrates a frequency filter analogous to the frequency filter disclosed in FIG. 3*a*, and comprising three transmission line segments.

FIG. 3*b* illustrates an analogous representation of transmission line segments having frequency characteristics similar to the filter arrangements schematically illustrated in FIG. 3*a*. Thus, between terminals 3/4 and 5/6 of the filter circuit illustrated in FIG. 3*a*, the analogous transmission line segments would comprise a line having electrical length $L_3=2vT$; and, wave impedance $Z_3=T/2C'$. The electrical length $L_3$ is proportional to the number of capacitors comprising the primary-auxiliary parallel capacitive network comprising a total of four capacitors. Further, since the basic filter networks connected between terminals 1–3 and 5–7 each comprise two parallel legs, the electrical lengths $$L_1=L_2=vT$$

respectively. The corresponding wave impedances $$Z_1=Z_2=T/2C$$

Thus at a modulation frequency ¼T, the first group of basic filters comprising secondary capacitors CO2 and CO3, functions as a dipole operated line segment, open at the end, having an electrical length equal to $\lambda/4$. Thus, this group is in series resonance and, therefore, has a very low electrical resistance. The second basic filter group comprising secondary capacitors CO5 and CO6, also has an electrical length equal to $\lambda/4$, and is, therefore, characteristic of a series resonance circuit and has a low electrical resistance.

Further, at this modulation frequency, the primary-parallel capacitive network connected between terminals 3/4 and 5/6 analogously comprise a quadripole operated transmission line segment, having an electrical length equal to $\lambda/2$. This particular transmission line segment equalizes the impedance between terminals 3/4 and 5/6. The impedance is independent of wave impedance $Z_3$, and is, therefore, not dependent upon the capacitance C′ of capacitors CO1H–CO1L. Thus, for a modulation frequency ¼T, the circuit illustrated in FIG. 3*a* represents a band pass filter.

On the other hand, at a modulation frequency ½T, the same frequency filter circuit illustrated in FIG. 3*a*, comprises a band rejection filter. Thus, the first basic filter group comprising capacitors CO5 and CO6 will each have analogous transmission line segments having electrical lengths, $\lambda/2$. This exhibits parallel resonant characteristics and thus the first and second filter groups have high impedances. Further, at this frequency, the transmission line segment $L_3$ has an electrical length $\lambda/4$ and is thus characteristic of a series resonant circuit having low resistance.

Under these conditions, the frequency filter illustrated in FIG. 3*a*, at modulation frequency ½T, exhibits the properties of a band rejection filter. However, as discussed in relation to the scanning theorem, modulation frequency ½T is at the border of the allowable frequencies thereby determined. Therefore, the rejection frequency is practically useable to only a limited extent. Thus, under the conditions described in relation to FIG. 3*a*, the only band pass frequency useable in the permitted frequency range exists at ¼T.

In the circuit illustrated in FIG. 3*a*, it is also possible, by varying the number of capacitors comprising the primary-parallel capacitor group COLH . . . COLL, to correspondingly vary the electrical lengths $L_1$, $L_2$, and $L_3$. This makes it possible to increase the number of fully useable reasonance frequencies, as well as to vary these frequencies, and thereby cause the circuit illustrated in FIG. 3*a* to function as a band pass or a band rejection filter.

Thus, as described, the electrical lengths of the analogous transmission line segments depicted in FIG. 3*b*, are in each case proportional to the number of capacitors corresponding thereto. By selectively varying the capacitance of capacitors CO2, CO3, CO5, and CO6 which are of equal capacitance C, and of capacitors COLH–COLL, which are assumed to be of equal capacitance C′, one can vary the wave impedances $Z_1$, $Z_2$, $Z_3$, which are independent from the number of capacitors comprising each basic filter group. The wave impedances affects the flank steepness of the frequency filter characteristics.

In the heretofore described frequency filters, it was necessary that generator G supply an input signal comprising either alternating current voltages or signal impulses having a successive frequency always equal to $1/T$, under the condition that the switches of the frequency filter were actuated within characteristic time interval or duration T. Under these conditions, the electrical lengths of the analogous transmission line segments are variable by a whole number multiple of $\Delta L-vT/2$, by varying the number of capacitors comprising a basic filter group. However, it is also possible to select the characteristic time interval or duration T of the frequency filters independently of the succession frequency of the signal impulses produced by generator G. Thereby the electrical lengths L of the analogous transmission line segments can be continuously varied as desired. This can be accomplished by inserting a conventional low pass filter between generator G and the frequency filter input terminals 1–2, which does not hinder the charge or energy exchanges within the frequency filter, and which provides a low pass frequency characteristic between input terminals 1 and 2 of the frequency filter. The characteristic time interval or duration T of the frequency filter is thereby made independent from the succession frequency of the signal inputs supplied by generator G, since this additional low pass filter connected between input terminals 1 and 2 of the frequency filter demodulates the signal impulses. By selectively varying the characteristic time interval or duration T, it is thus possible to change as desired the electrical lengths, $L_1$ of the transmission line segments which are analogous to the basic filters. Thereby the resonance frequencies of the frequency filters can be varied. Also the succession frequency of the signal impulses supplied by generator G can be changed, holding the characteristic time period T, constant without influencing the frequency of the frequency filter. Then generator G may supply sine (shaped) alternating signal currents.

Another modification of the invention is possible by substituting an additional frequency filter for generator G, having the characteristic time interval or period T'. Thus, it is optionally possible to deviate the characteristic time T' of the additional frequency filter from the characteristic period T of the primary frequency, in effect, this represents a chain type circuit, wherein by the insertion of conventional low pass filters of the type described above, frequecny filters having different characteristic time periods can be switched in series. Further, the resonance frequencies of each frequency filter comprising a group can thus be changed continuously as desired, independent from the other frequency filters in the same chain.

Further, by insertion of a low pass filter between output terminals 7 and 8 of the frequency filter and consumer V, the amplitude modulated signal impulses can be demodulated, thereby supplying consumer V, with only the modulation frequency.

Other type frequency filters can be substituted for such conventional low pass filters. For example, conventional switch-free filters can be combined with frequency filters controlled by switches, wherein still further variations are possible in the frequency characteristic obtained. Of course, the frequency filters disclosed in this application, as well as in the copending applications, can comprise integrated circuits, developed from RC filters.

What is claimed is:

1. A T type four terminal frequency filter configuration responsive to control pulses which determine the characteristic frequency of the filter, comprising:

first and second input terminals (1, 2), first and second output terminals (7, 8), first and second energy storage means (CO2, CO3, CO4, CO5, CO6, CO7) connected to form the first and second arms, respectively, of the configuration, third energy storage means (CO1*h*) connected to form the leg of the configuration, first switching means (S2, S3, S4; S5, S6, S7) connected to said first and second energy storage means, and selectively actuable by the control pulses to complete a circuit for effecting pulse-type energy exchanges between said associated energy storage means.

2. A frequency filter as recited in claim 1, wherein the first, second, and third energy storage means comprise capactive means.

3. A frequency filter as recited in claim 1 wherein the first second, and third energy storage means each comprise at least one capacitor.

4. A frequency filter as recited in claim 1 wherein said first and second energy storage means each comprise a plurality of capacitors (CO2, CO3, CO4; CO5, CO6, CO7), and wherein said switching means comprises a plurality of switches (S2 . . . S7) individually connected in series with associated ones of the plurality of capacitors.

5. A frequency filter as recited in claim 4 wherein said switching means are actuated to alternately and simultaneously switch said plurality of said individual switches associated with said first and second energy storage means successively in pairs (S2 and S5; S3 and S6; S4 and S7).

6. A frequency filter as recited in claim 4 wherein individual switches associated with the first and second energy storage means are alternately actuated according to a predetermined repeating series (S2, S5, S3, S6, S4 and S7).

7. A frequency filter as recited in claim 1 wherein said third energy storage means comprises a primary capacitor (CO1*h*) and a plurality of auxiliary capacitors CO1*i* . . . CO1*n*) connected in parallel with the primary capacitor and said switching means comprises a plurality of switches (S8 . . . S13) corresponding to said plurality of auxiliary capacitors, each of said switches being operative in response to control pulses to independently complete a circuit for effecting pulse-type energy exchanges between associated energy storage means.

8. A frequency filter as recited in claim 7 wherein said plurality of switches are connected in series between alternate parallel and auxiliary capacitors.

9. The frequency filter as recited in claim 2 wherein a low pass frequency filter is connected between the first and second input terminals.

10. A frequency filter as recited in claim 2 wherein a low pass frequency filter is connected between the first and second output terminals.

References Cited

UNITED STATES PATENTS

| | | | |
|---|---|---|---|
| 2,752,491 | 6/1956 | Ringoen | 333—70 XR |
| 2,822,978 | 2/1958 | Donovan | 333—19 XR |
| 3,061,680 | 10/1962 | Frankel | 179—15 |
| 3,062,919 | 11/1962 | Jacob | 179—15 |

HERMAN KARL SAALBACH, Primary Examiner

M. NUSSBAUM, Assistant Examiner

U.S. Cl. X.R.

235—181; 328—165